United States Patent
Araki et al.

(10) Patent No.: US 9,738,742 B2
(45) Date of Patent: Aug. 22, 2017

(54) METHOD FOR PRODUCING POLYMER

(71) Applicant: Asahi Kasei Chemicals Corporation, Tokyo (JP)

(72) Inventors: Yoshifumi Araki, Tokyo (JP); Eiji Sasaya, Tokyo (JP); Takuya Suzuki, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 20 days.

(21) Appl. No.: 14/761,356

(22) PCT Filed: Jan. 8, 2014

(86) PCT No.: PCT/JP2014/050122
§ 371 (c)(1),
(2) Date: Jul. 16, 2015

(87) PCT Pub. No.: WO2014/112411
PCT Pub. Date: Jul. 24, 2014

(65) Prior Publication Data
US 2015/0353669 A1  Dec. 10, 2015

(30) Foreign Application Priority Data
Jan. 16, 2013 (JP) .................................. 2013-005658

(51) Int. Cl.
| C08F 230/10 | (2006.01) |
| C08C 2/00 | (2006.01) |
| C08F 36/04 | (2006.01) |
| C08F 236/10 | (2006.01) |
| C08F 6/06 | (2006.01) |
| C08F 297/04 | (2006.01) |

(52) U.S. Cl.
CPC .............. *C08F 236/10* (2013.01); *C08F 6/06* (2013.01); *C08F 36/04* (2013.01); *C08F 297/04* (2013.01)

(58) Field of Classification Search
CPC .......... C08F 236/10; C08F 6/06; C08F 36/04; C08F 36/06; C08F 297/04; C08J 3/07; C08C 2/00
See application file for complete search history.

(56) References Cited

U.S. PATENT DOCUMENTS 5,534,592 A  7/1996  Halasa et al.

FOREIGN PATENT DOCUMENTS

| CA | 1321852 C | 8/1993 |
| JP | S51-086588 A | 7/1976 |
| JP | S51-093990 A | 8/1976 |
| JP | S63-264602 A | 11/1988 |
| JP | S63-284203 A | 11/1988 |
| JP | 64-054016 | * 3/1989 |
| JP | S64-054016 A | 3/1989 |
| JP | S64-056712 A | 3/1989 |
| JP | H04-175304 A | 6/1992 |
| JP | H06-136034 A | 5/1994 |
| JP | H09-124728 A | 5/1997 |
| JP | H09-132609 A | 5/1997 |
| JP | 2000-095804 A | 4/2000 |
| JP | 2002-060414 A | 2/2002 |
| JP | 2003-040919 A | 2/2003 |

OTHER PUBLICATIONS

JP 64-054016, machine translation, 1989.*
Wikipedia "Solution", https://en.wikipedia.org/wiki/Solution, 2016.*
Search Report issued in counterpart European Patent Application No. 14740721.7 dated Dec. 23, 2015.
International Search Report issued in corresponding International Patent Application No. PCT/JP2014/050122 dated Mar. 11, 2014.
International Preliminary Report on Patentability issued in corresponding International Patent Application No. PCT/JP2014/050122 dated Jul. 21, 2015.

* cited by examiner

*Primary Examiner* — Roberto Rabago
(74) *Attorney, Agent, or Firm* — Morgan, Lewis & Bockius LLP

(57) ABSTRACT

A method for producing a polymer has: a polymerization step of polymerizing at least a conjugated diene monomer in a hydrocarbon solvent using an organolithium compound as a polymerization initiator, and obtaining a polymer; and, following steps (1) to (4), successively performing after the polymerization step: (1) a step of mixing an acid and water of 20 to 300 parts by mass into the solution containing the polymer of 100 parts by mass, (2) a step of adjusting an amount of the water to 10 parts by mass or less based on 100 parts by mass of the solution containing the polymer, (3) a step of adding a carbon oxide gas and/or a compound to be decarboxylated to the solution containing the polymer, and (4) a step of removing a solvent from the solution containing the polymer until a concentration of the polymer reaches 95 mass % or more.

13 Claims, No Drawings

METHOD FOR PRODUCING POLYMER

TECHNICAL FIELD

The present invention relates to a method for producing a polymer.

BACKGROUND ART

Conventionally, conjugated diene polymers are widely used in footwear, modification of plastics, asphalt, viscous adhesion field, and the like.

In the production of a conjugated diene polymer, a monomer is polymerized in a hydrocarbon solvent inert to a catalyst, and a conjugated diene polymer produced is obtained in a state uniformly dissolved or in a state suspended in the solvent. Therefore, in order to recover the conjugated diene polymer, a step of separating the conjugated diene polymer and the solvent is required.

Examples of the method of separating a conjugated diene polymer and a solvent include a steam stripping method and a direct solvent removal method. A direct solvent removal method in which a solvent is removed from a polymer solution in a vent extruder to recover a conjugated diene polymer has been proposed as an advantageous method in terms of economical efficiency (for example, refer to Patent Literature 1, 2).

However, a molded article prepared by molding the conjugated diene polymer obtained by the direct solvent removal method still has a point that should be improved in terms of quality. Therefore, in terms of economical efficiency and quality, there is required a method different from the steam stripping method which provides relatively good quality but is poorer than the direct solvent removal method in terms of economical efficiency.

Conventionally, following methods have been proposed to the above requirement.

Patent Literature 3 proposes a method including deactivating an active terminal after polymerization and then adding two types of phenolic compounds.

Patent Literature 4 proposes a method including deactivating an active terminal after polymerization, adjusting the pH of a polymer solution, adding a phenolic stabilizer, removing a solvent with a screw having a vent zone, and further adding a phosphorus stabilizer.

Patent Literature 5 proposes a method including deactivating an active terminal after polymerization, adding a carbon oxide gas to a polymer solution and neutralizing a catalyst residue in a step of continuously transferring the polymer solution to a solvent removing step.

Patent Literature 6 proposes a method including adding an antioxidant and an optional terminator after polymerization, adjusting the solution concentration to 76.9 mass % or more (the amount of a residual solvent to 30 parts by mass or less based on 100 parts by mass of a polymer), and then adding a carbon oxide gas in the state where the water content is adjusted to 0.5 mass % or less.

CITATION LIST

Patent Literature

Patent Literature 1: Japanese Patent Laid-Open No. 51-086588
Patent Literature 2: Japanese Patent Laid-Open No. 63-284203
Patent Literature 3: Japanese Patent Laid-Open No. 04-175304
Patent Literature 4: Japanese Patent Laid-Open No. 09-124728
Patent Literature 5: Japanese Patent Laid-Open No. 2002-60414
Patent Literature 6: Japanese Patent Laid-Open No. 63-264602

SUMMARY OF INVENTION

Technical Problem

However, the above-described techniques which have conventionally been proposed still have a problem that there is still a point that should be improved in the properties of a molded article and a polymer used for producing the molded article.

Therefore, an object of the present invention is to provide a method for producing a polymer having high quality and excellent in handleability at a low cost, wherein the polymer has good color, high heat discoloration resistance, and high resistance to loss of transparency of a molded article, and hardly clogs a filter of an extruder during production thereof.

Solution to Problem

As a result of intensive research to solve the above problems of the prior art, the present inventors have found that the problems of the prior art as described above can be solved by polymerizing at least a conjugated diene monomer in a hydrocarbon solvent using an organolithium compound as a polymerization initiator, and obtaining a polymer and performing a predetermined step after the polymerization step when recovering the polymer by removing a hydrocarbon solvent from a solution containing the polymer. The present invention has been completed on the basis of these findings.

Namely, the present invention is as follows.

[1]
A method for producing a polymer comprising: a polymerization step of polymerizing at least a conjugated diene monomer in a hydrocarbon solvent using an organolithium compound as a polymerization initiator, and obtaining a polymer; and, following steps (1) to (4), successively performing after the polymerization step:
(1) a step of mixing an acid and water of 20 to 300 parts by mass into the solution containing the polymer of 100 parts by mass,
(2) a step of adjusting an amount of the water to 10 parts by mass or less based on 100 parts by mass of the solution containing the polymer,
(3) a step of adding a carbon oxide gas and/or a compound to be decarboxylated to the solution containing the polymer, and
(4) a step of removing a solvent from the solution containing the polymer until a concentration of the polymer reaches 95 mass % or more.

[2]
The method for producing the polymer according to the above [1], wherein the solution containing the polymer contains a titanium compound and a lithium compound.

[3]
The method for producing the polymer according to the above [2], wherein a molar ratio of titanium in the titanium compound to the acid mixed in the step (1), molar quantity of titanium in the titanium compound/molar quantity of the acid, is 0.02 to 0.35.

[4]

The method for producing the polymer according to any one of the above [1] to [3], wherein a molar ratio of the acid mixed in the step (1) to the carbon oxide gas and/or the compound to be decarboxylated mixed in the step (3), molar quantity of the acid/molar quantity of a sum of the carbon oxide gas and the compound to be decarboxylated, is 0.1 to 2.0.

[5]

The method for producing the polymer according to any one of the above [1] to [4], wherein the acid mixed in the step (1) is an inorganic acid.

[6]

The method for producing the polymer according to any one of the above [1] to [5], wherein the carbon oxide gas is added in the step (3).

[7]

The method for producing the polymer according to any one of the above [1] to [6], wherein the solvent is directly removed in the step (4).

[8]

The method for producing the polymer according to any one of the above [1] to [7], further comprising step (A) of adding an antioxidant to the solution containing the polymer after the step (3).

[9]

The method for producing the polymer according to any one of the above [1] to [8], further comprising a step of removing a part of the solvent in the solution containing the polymer after the step (3) and before the step (4).

[10]

The method for producing the polymer according to any one of the above [1] to [9], wherein the step (2) is performed by decantation.

[11]

The method for producing the polymer according to any one of the above [1] to [10], wherein the step (2) is performed using a centrifuge.

[12]

The method for producing the polymer according to any one of the above [1] to [11], wherein the polymer is a block copolymer formed of the conjugated diene monomer and an aromatic vinyl monomer.

[13]

The method for producing the polymer according to any one of the above [1] to [12], wherein the polymer has a vinyl content based on a total amount of conjugated diene monomer units before hydrogenation of 50 mol % or more.

Advantageous Effects of Invention

The present invention can provide a method for producing a polymer which hardly clogs a filter of an extruder during production thereof and has good color, high heat discoloration resistance, and high resistance to loss of transparency.

DETAILED DESCRIPTION OF THE PREFERRED EMBODIMENTS

Hereinafter, the embodiment of the present invention (hereinafter referred to as "the present embodiment") will be described in detail. The present invention is not limited to the following embodiment and may be variously modified within the scope of the gist of the present invention.

Note that, in the following description, the structural unit which forms a polymer is referred to as "—monomer unit", which may only be described as "—monomer" by omitting "unit" when it is described as a material of a polymer.

[Method for Producing Polymer]

The method for producing a polymer of the present embodiment comprises: a polymerization step of polymerizing at least a conjugated diene monomer in a hydrocarbon solvent using an organolithium compound as a polymerization initiator, and obtaining a polymer; and, following steps (1) to (4) successively performing after the polymerization step:

(1) a step of mixing an acid and water of 20 to 300 parts by mass into the solution containing the polymer of 100 parts by mass, (2) a step of adjusting an amount of the water to 10 parts by mass or less based on 100 parts by mass of the solution containing the polymer, (3) a step of adding a carbon oxide gas and/or a compound to be decarboxylated to the solution containing the polymer, and (4) a step of removing a solvent from the solution containing the polymer until a concentration of the polymer reaches 95 mass % or more.

In the present embodiment, the solution containing a polymer refers to a polymer solution after completion of polymerization reaction, which at least contains a hydrocarbon solvent which is a reaction solvent and a polymer.

Here, the concentration of a polymer in the solution containing the polymer is preferably 10 to 30 mass %, more preferably 15 to 25 mass %.

(Polymerization Step)

In the polymerization step, a polymerizable monomer containing at least a conjugated diene monomer is polymerized in a hydrocarbon solvent using an organolithium compound as a polymerization initiator and obtaining a polymer.

<Polymerizable Monomer>

At least a conjugated diene monomer is used as a polymerizable monomer.

The conjugated diene monomer is a diolefin having a pair of conjugated double bonds, and examples thereof include, but are not limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Preferred examples include 1,3-butadiene and isoprene.

1,3-Butadiene is more preferred in terms of mechanical strength.

These may be used singly or in combination.

In addition to the conjugated diene, a different monomer copolymerizable with the conjugated diene can be used as a polymerizable monomer.

Examples of the different monomer copolymerizable with the conjugated diene which can be used include, but are not limited to, vinyl aromatic monomers. Examples of the vinyl aromatic monomers include vinyl aromatic compounds such as styrene, α-methylstyrene, p-methylstyrene, divinylbenzene, 1,1-diphenylethylene, N,N-dimethyl-p-aminoethyl styrene, and N,N-diethyl-p-aminoethyl styrene. These may be used singly or in combination.

The method for producing a polymer of the present embodiment is suitably applied to the production of a thermoplastic elastomer in terms of the ease of recovering a polymer from a solvent.

Among the thermoplastic elastomers, a block copolymer containing at least a polymer block mainly composed of a conjugated diene monomer and a polymer block mainly composed of a vinyl aromatic monomer is suitable in terms of the ease of recovering a polymer.

The above "mainly composed of" means that a polymer contains the monomer unit in an amount of 60 mass % or more. A polymer preferably contains the monomer unit in an amount of 80 mass % or more, more preferably 90 mass % or more, further preferably 95 mass % or more.

The content of a vinyl aromatic monomer unit in a polymer is preferably 70 mass % or less in terms of the ease of recovering a polymer from a solvent and the flexibility of a polymer produced and a molded article thereof, and is preferably 10 mass % or more in terms of elasticity. The content of a vinyl aromatic monomer unit in a polymer is more preferably 13 mass % or more and 60 mass % or less, further preferably 13 mass % or more and 50 mass % or less, further more preferably 15 mass % or more and 45 mass % or less.

Examples of the structure of the block copolymer include, but are not limited to, following formulae (i) to (vi).

$$(a-b)_n \quad \text{(i)}$$

$$b-(a-b)_n \quad \text{(ii)}$$

$$a-(b-a)_n \quad \text{(iii)}$$

$$a-(b-a)_n-X \quad \text{(iv)}$$

$$[(a-b)_k]_m-X \quad \text{(v)}$$

$$[(a-b)_k-a]_m-X \quad \text{(vi)}$$

In formulae (i) to (vi), "a" represents a block mainly composed of a vinyl aromatic monomer unit, and "b" represents a block mainly composed of a conjugated diene monomer unit or a hydrogenated block thereof.

When a plurality of polymer blocks "a" and "b" are present in a block copolymer, the structure in terms of the molecular weight, the composition and the like of each block may be the same or different.

In formulae (i) to (vi), "X" represents a residue of a coupling agent or a residue of a polymerization initiator such as a polyfunctional organolithium. Examples thereof include, but are not limited to, tetrachlorosilane, tin tetrachloride, epoxidized soybean oil, a polyhalogenated hydrocarbon compound, a carboxylate compound, a polyvinyl compound, a bisphenol-type epoxy compound, an alkoxysilane compound, a halogenated silane compound, and an ester-based compound.

In formulae (i) to (vi), "m", "n", and "k" represent an integer of 1 or more, and is preferably an integer of 1 to 5.

The polymer may be a mixture of a coupled product and a non-coupled product.

The boundary and the endmost part of each block are not necessarily needed to be clearly distinguished. For example, a copolymer block of a vinyl aromatic monomer unit and a conjugated diene monomer unit may be present.

The distribution of a vinyl aromatic monomer unit in each polymer block is not limited as long as it is within the range of the content of the vinyl aromatic compound, and the vinyl aromatic monomer unit may be uniformly distributed or may be distributed in a tapered shape, a step shape, a convex shape, or a concave shape. Further, a crystal part may be present in the polymer block. In each polymer block, a plurality of segments each having a different content of a vinyl aromatic compound may be present.

In the method for producing a polymer of the present embodiment, the polymer is preferably a polymer in which an unsaturated group in the conjugated diene monomer unit is hydrogenated, in terms of suppressing thermal degradation of the polymer when the polymer is recovered from a hydrocarbon solvent as will be described below, the durability of the polymer produced by the method for producing a polymer of the present embodiment, and in terms of compatibility with polyethylene and polypropylene.

Note that the polymer obtained by the method for producing a polymer of the present embodiment includes both a hydrogenated product and a non-hydrogenated product.

Further, since the heat resistance of a polymer is improved by hydrogenation, a hydrogenated product of a polymer has an advantage of being suitable for a direct solvent removal method.

The degree of hydrogenation of the hydrogenated product of a polymer can be arbitrarily selected depending on the properties of the polymer and a molded article. For example, the aliphatic double bond based on conjugated diene is hydrogenated in an amount of preferably 3% or more and less than 80%, more preferably 5% or more and less than 75% for improving thermal degradation resistance and the like while maintaining the properties of a non-hydrogenated block copolymer, and hydrogenated in an amount of preferably 80% or more, more preferably 90% or more for improving thermal degradation resistance and weatherability.

The degree of hydrogenation of a polymer can be measured by NMR, specifically can be measured by the method described in Examples to be described below.

The weight average molecular weight of the polymer obtained by the production method of the present embodiment is preferably 10,000 or more in terms of the ease of recovery and the mechanical properties of the recovered polymer, and preferably 300,000 or less in terms of the ease of recovery. The weight average molecular weight of the polymer is more preferably 20,000 or more and 200,000 or less, further preferably 30,000 or more and 150,000 or less.

The weight average molecular weight of a polymer can be measured by GPC (gel permeation chromatography), specifically can be measured by the method described in Examples to be described below.

Further, in a medical field, a polypropylene resin composition is often used as a material for medical devices. When a polymer obtained by the production method of the present embodiment is utilized for the polypropylene resin composition, it is necessary to have high compatibility with polypropylene. From such a point of view, it is preferred to prepare a hydrogenated product having high compatibility with polypropylene. Further, with respect to the microstructure of conjugated dienes, the vinyl content is preferably 50 mol % or more, more preferably 60 mol % or more, further preferably 67 mol % or more, further more preferably 72 mol % or more, based on a total amount of the conjugated diene monomer units in a polymer before hydrogenation.

Here, the vinyl content is defined by the proportion of conjugated dienes incorporated by bonding patterns of the 1,2-bond and 3,4-bond based on the total molar amount of conjugated dienes incorporated by bonding patterns of the 1,2-bond, 3,4-bond, and 1,4-bond of conjugated dienes before hydrogenation.

The vinyl content can be measured by NMR, specifically can be measured by the method described in Examples to be described below.

The polymer obtained by the production method of the present embodiment is excellent in color, heat discoloration resistance, and resistance to loss of transparency of a molded article. Therefore, the polymer obtained by the method for producing a polymer of the present embodiment can be suitably used in the applications in which appearance is regarded as important and medical application because good color, high heat discoloration resistance, and high resistance to loss of transparency of a molded article are further required in these applications.

A known method can be applied to the polymerization method performed in the polymerization step in the method for producing a polymer of the present embodiment without particular limitation. Examples of the known method include methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 56-28925, Japanese Patent Laid-Open No. 59-166518, and Japanese Patent Laid-Open No. 60-186577.

<Hydrocarbon Solvent>

As described above, a hydrocarbon solvent is used in the polymerization step.

Examples of the hydrocarbon solvent include, but are not limited to, aliphatic hydrocarbons such as butane, pentane, hexane, isopentane, heptane, and octane; alicyclic hydrocarbons such as cyclopentane, methylcyclopentane, cyclohexane, methylcyclohexane, and ethylcyclohexane; and aromatic hydrocarbons such as benzene, toluene, ethylbenzene, and xylene.

These may be used singly or in combination.

<Polymerization Initiator>

In the polymerization step, at least an organolithium compound is used as a polymerization initiator.

All of an organic monolithium compound, an organic dilithium compound, and an organic polylithium compound, which have one or more lithium atoms bonded thereto per molecule, can be used as the organolithium compound.

Examples of the organolithium compound include, but are not limited to, ethyllithium, n-propyllithium, isopropyllithium, n-butyllithium, sec-butyllithium, tert-butyllithium, hexamethylene dilithium, butadienyl dilithium, and isoprenyl dilithium. These may be used singly or in combination.

In the polymerization step, a predetermined polar compound and a randomizing agent can be used for the purpose of adjusting the rate of polymerization, modifying the microstructure (the ratio of cis, trans, and vinyl) of the conjugated diene monomer units polymerized, adjusting the reaction ratio of a conjugated diene monomer to a vinylaromatic monomer, and the like.

Examples of the polar compound and the randomizing agent include, but are not limited to, ethers such as tetrahydrofuran, diethylene glycol dimethyl ether, and diethylene glycol dibutyl ether; amines such as triethylamine and tetramethylethylenediamine; thioethers, phosphines, phosphoramides, alkylbenzenesulfonates, and alkoxides of potassium and sodium.

As described above, the polymer obtained in the polymerization step may also be modified to a hydrogenated product by hydrogenation reaction.

Known examples of the catalyst used in hydrogenation reaction include, but are not limited to, (1) a supported-type heterogeneous catalyst in which a metal such as Ni, Pt, Pd, and Ru is supported by a carrier such as carbon, silica, alumina, and diatomaceous earth, and (2) a so-called Ziegler type catalyst using an organic salt or an acetylacetone salt of Ni, Co, Fe, Cr, and the like and a reductant such as an organic Al, or a so-called organic complex catalyst such as an organometallic compound of Ru, Rh, and the like, or a homogeneous catalyst in which an organic Li, an organic Al, an organic Mg, and the like are used as a reductant for a titanocene compound.

Examples of the hydrogenation method include, but are not limited to, the methods described in Japanese Patent Publication No. 42-8704 and Japanese Patent Publication No. 43-6636, and preferred examples thereof include the methods described in Japanese Patent Publication No. 63-4841 and Japanese Patent Publication No. 63-5401. Specifically, a polymer can be hydrogenated in an inert solvent in the presence of a catalyst for hydrogenation to obtain a hydrogenated block copolymer solution.

The hydrogenation reaction is preferably performed, but not limited to, after a step of deactivating an active terminal of a polymer to be described below in terms of high hydrogenation activity.

In the method for producing a polymer of the present embodiment, a solution containing a polymer before steps (1) to (4) to be described in detail below is preferably in the state of containing a titanium compound and a lithium compound. This is because, in such a case, the effect of the present invention is more significantly obtained.

The present inventors have found that when a known method of separating a polymer and a solvent is applied to a polymer-containing solution containing both a titanium compound and a lithium compound, sufficient properties cannot be obtained in the color, heat discoloration resistance, and resistance to loss of transparency of a molded article.

Examples of the titanium compound and the lithium compound include residues of a polymerization initiator used in the polymerization reaction and a catalyst used in the hydrogenation reaction as described above.

In the present embodiment, the content of the lithium compound in the solution containing a polymer before steps (1) to (4) is preferably 0.02 to 0.25 mass %, more preferably 0.02 to 0.20 mass %, further preferably 0.06 to 0.20 mass %, further more preferably 0.04 to 0.17 mass % based on the polymer.

The molar ratio of titanium (Ti) to lithium (Li) (Ti/Li) in the titanium compound and the lithium compound, is preferably 0.03 to 0.15, more preferably 0.06 to 0.08.

(Step of Deactivating Active Terminal of Polymer)

In the method for producing a polymer of the present embodiment, a step of deactivating an active terminal of the polymer is preferably performed after the polymerization step.

Deactivating an active terminal of a polymer allows achievement of good color, high heat discoloration resistance, and high resistance to loss of transparency of a molded article, and low filter clogging of an extruder during production.

Examples of the method for deactivating an active terminal of a polymer include, but are not particularly limited to, a method of adding a quencher to an active polymer solution in a polymerizer used in the polymerization step.

The active polymer solution refers to a solution which, when a conjugated diene monomer or an aromatic vinyl monomer is added to a solution containing a polymer, polymerizes with the added monomer.

Examples of the quencher include, but are not particularly limited to, a compound having an active hydrogen, an organic halide, and an inorganic halide.

Examples of the compound having an active hydrogen include, but are not limited to, water, alcohol, thiol, amine, inorganic acid, and organic acid.

Examples of the organic halide and the inorganic halide include, but are not limited to, an alkyl halide compound, silicon halide, tin halide, an ester compound, an amide compound, a ketone compound, and an aldehyde compound.

Among these, water and alcohol are preferred, and alcohol is more preferred, in terms of economical efficiency and the color of a molded article. Water and alcohol may be used in combination.

Among the alcohols, an alcohol having 1 to 3 carbon atoms is preferred in terms of having low boiling point, hardly remaining in a polymer when being removed from a solution containing a polymer and recovering the polymer as described below, hardly remaining in a polymer, and having no odor.

The amount of the quencher added is preferably, but not particularly limited to, in the range of 0.1 to 10 equivalents, more preferably 0.5 to 2.0 equivalents, further preferably 0.6 to 1.5 times equivalents, based on the organolithium compound which is the polymerization initiator, in terms of the color, heat discoloration resistance, and resistance to loss of transparency of a molded article, and suppression of filter clogging of an extruder.

(Step (1): Step of Mixing Acid and 20 to 300 Parts by Mass of Water into 100 Parts by Mass of Solution Containing Polymer)

After the polymerization step, preferably after the step of deactivating the active terminal of a polymer as described above, a step of mixing an acid and water of 20 to 300 parts by mass into a solution containing a polymer of 100 parts by mass (may also be described as step (1)) is performed.

This allows achievement of good color, high heat discoloration resistance, and high resistance to loss of transparency of a molded article, and suppression of filter clogging of an extruder during production.

The amount of water mixed with the solution containing a polymer is 20 to 300 parts by mass, preferably 30 to 200 parts by mass, more preferably 40 to 150 parts by mass, further preferably 50 to 100 parts by mass, based on 100 parts by mass of the solution containing a polymer, in terms of good color, high heat discoloration resistance, and high resistance to loss of transparency of a molded article, and suppression of filter clogging of an extruder during production.

Examples of the acid mixed into the solution containing a polymer include, but are not limited to, inorganic acids such as hydrochloric acid, sulfuric acid, phosphoric acid, and boric acid, and organic acids such as benzoic acid, lactic acid, citric acid, tartaric acid, octylic acid, capric acid, lauric acid, myristic acid, palmitic acid, stearic acid, chlorobenzoic acid, aminobenzoic acid, cinnamic acid, and phenylacetic acid.

These acids may be used singly or in combination.

Inorganic acids are preferred in terms of removability and a small adverse influence when mixed into a molded article. Hydrochloric acid, sulfuric acid, and nitric acid are more preferred, and hydrochloric acid and sulfuric acid are further preferred.

The amount of an acid added is adjusted so that the pH of water to be removed may be in a preferred range, as will be described in step (2): a step of adjusting an amount of the water to 10 parts by mass or less based on 100 parts by mass of a solution containing a polymer to be described below. Therefore, the amount of an acid added is selected depending on the strength and the mixing state of the acid.

The pH of water to be removed refers to the pH of water in a removing step in which the amount of water removed is the largest among water-removing steps until the polymer is introduced into an extruder as will be described below.

In the method of adding an acid and water in step (1), the acid and water may be separately added, or the acid and water may be mixed before being added. In terms of the ease of mixing an acid and water with a solution containing a polymer, it is preferred to mix an acid with water and then mix the resulting mixture with a solution containing a polymer.

Examples of the method of mixing an acid and water with a solution containing a polymer include, but are not particularly limited to, a method of using a stirrer, a rotating disperser, a static mixer, or the like.

As described above, when the solution containing a polymer contains a titanium compound, a molar ratio of the titanium compound to the acid in step (1) (molar quantity of titanium (Ti) in the titanium compound/molar quantity of the acid) is preferably 0.02 to 0.35, more preferably 0.03 to 0.25, further preferably 0.04 to 0.2, in terms of the color of a molded article, resistance to loss of transparency, and filter clogging resistance.

The titanium compound is a compound containing Ti, which may contain Li therein.

(Step 2: Step of Adjusting Amount of Water to 10 Parts by Mass or Less Based on 100 Parts by Mass of Solution Containing Polymer)

After the step (1): the step of mixing an acid and water of 20 to 300 parts by mass into a solution containing a polymer of 100 parts by mass, a step of adjusting an amount of water to 10 parts by mass or less based on 100 parts by mass of the solution containing a polymer (may also be described as step (2)) is performed.

This allows obtaining good color, high heat discoloration resistance, and high resistance to loss of transparency of a molded article, and suppressing filter clogging of an extruder during production.

Further, the amount of water is adjusted to 10 parts by mass or less, preferably 5 parts by mass or less, more preferably 2 parts by mass or less, further preferably 1 part by mass or less, based on 100 parts by mass of a solution containing a polymer, in terms of the ease of removing a solvent in step (4) to be described below.

The pH of water to be removed is preferably 3 or more in terms of good color and corrosion prevention of production facilities, and is preferably 11 or less in terms of obtaining high heat discoloration resistance and high resistance to loss of transparency and securing filter clogging resistance of an extruder during production. The pH of water to be removed is more preferably 5 or more and 10 or less, further preferably 6 or more and 8.5 or less, further more preferably 6.5 or more and 7.5 or less.

Further, in step (2), a metal derived from a polymerization initiator and a metal derived from a hydrogenation catalyst as described above are preferably removed from the solution containing a polymer.

In terms of obtaining good color, high heat discoloration resistance, and high resistance to loss of transparency of a molded article, and improving high filter clogging resistance of an extruder during production, the removal rate of metal in step (2) is preferably 30 mass % or more, more preferably 50 mass % or more, further preferably 75 mass % or more, further more preferably 90 mass % or more, based on the total amount of metal.

In step (2), the method of adjusting the amount of water to 10 parts by mass or less based on 100 parts by mass of a solution containing a polymer is not particularly limited. However, decantation and a method of using a centrifuge are preferred in terms of the ease of operation and the removability of metal; a method of centrifuging is preferred in terms of the removability of metal; and, particularly, a method of centrifuging after decantation is more preferred.

Further, the residence time of decantation is preferably 5 minutes or more, more preferably 10 minutes or more.

Further, the relative centrifugal acceleration of a centrifuge is preferably 1000 G or more, more preferably 3000 G or more, further preferably 5000 G or more.

(Step (3): Step of Adding Carbon Oxide Gas and/or Compound to be Decarboxylated to Solution Containing Polymer)

After the step (2), a step of adding a carbon oxide gas and/or a compound to be decarboxylated to a solution containing a polymer (may also be described as step (3)) is performed.

This allows obtaining good color, high heat discoloration resistance, and high resistance to loss of transparency of a molded article, and suppressing filter clogging of an extruder during production.

The compound to be decarboxylated includes a compound having a carboxyl group, and examples thereof include, but are not limited to, oxalic acid, malonic acid, and succinic acid.

It is preferred to add a carbon oxide gas to the solution containing a polymer in terms of few impurities into a molded article, a low odor, and economical efficiency.

The carbon oxide gas and/or the compound to be decarboxylated may be added to the solution containing a polymer directly or may be added in a state where the compound is dissolved in water or a solvent.

The carbon oxide gas is carbon dioxide. The carbon oxide gas may be a liquid or a solid during storage. Carbon dioxide is a gas (a carbon oxide gas) at ordinary temperature and ordinary pressure.

In the method of adding the carbon oxide gas and/or a compound to be decarboxylated to a solution containing a polymer, the gas and/or the compound may be intermittently or continuously brought into contact with the solution containing a polymer, but is preferably continuously added in terms of good color, high heat discoloration resistance, and high resistance to loss of transparency of a molded article.

Examples of the method of adding a carbon oxide gas in step (3) include a method of blowing a carbon oxide gas into the middle of a transportation pipe of the solution containing a polymer and a method of providing a mixing vessel and blowing a carbon oxide gas into the vessel. The method of blowing carbonic acid gas into the middle of a transportation pipe of the solution containing a polymer is preferred in terms of the ease of operation.

The concentration of a polymer in a solution containing a polymer is preferably 10 mass % or more in terms of the contact frequency between a carbon oxide gas and/or a compound to be decarboxylated and a solution containing a polymer, and the concentration of a polymer in a solution containing a polymer is preferably 50 mass % or less in terms of the diffusibility of a carbon oxide gas and/or a compound to be decarboxylated in a solution containing a polymer. The concentration of a polymer is more preferably 12 mass % or more and 30 mass % or less, more preferably 15 mass % or more and 25 mass % or less, further preferably 15 mass % or more and less than 20 mass %.

In the step of adding a carbon oxide gas and/or a compound to be decarboxylated, a stirrer and a static mixer are preferably used in terms of high miscibility of a carbon oxide gas and/or a compound to be decarboxylated with a solution containing a polymer.

The amount of a carbon oxide gas and/or a compound to be decarboxylated added is preferably 0.01 mol or more based on 1 mol of lithium in a polymerization initiator used in the polymerization step in terms of good color, high heat discoloration resistance, and high resistance to loss of transparency of a molded article, and suppression of filter clogging of an extruder during production, and is preferably less than 1.0 mol in terms of economical efficiency and corrosiveness of production facilities. The amount of a carbon oxide gas and/or a compound to be decarboxylated added is more preferably 0.05 mol or more and 0.8 mol or less, further preferably 0.1 mol or more and 0.5 mol or less, further more preferably 0.1 mol or more and 0.4 mol or less, based on 1 mol of lithium in a polymerization initiator.

Further, the molar ratio of an acid in the step (1) to a carbon oxide gas and/or a compound to be decarboxylated added in step (3) (that is, a molar quantity of the acid in the step (1)/a total molar quantity of a sum of the carbon oxide gas and the compound to be decarboxylated) is preferably 0.1 to 2.0, more preferably 0.1 to 1.9, further preferably 0.1 to 1.8, in terms of heat discoloration resistance and filter clogging resistance.

(Step (4): Step of Removing Solvent from Solution Containing Polymer Until Concentration of Polymer Reaches 95 Mass % or More)

After the step (3), a step of removing the solvent from the solution containing the polymer until a concentration of the polymer reaches 95 mass % or more (may also be described as step (4)) is performed.

The method of removing a solvent is not particularly limited, but a direct solvent removal method is preferably applied in terms of the high amount of solvent recovered, the color or heat discoloration resistance of a molded article.

The effect of removal of volatile matter in a molded article which poses a problem of health is obtained by adjusting the concentration of a polymer to 95 mass % or more. The concentration of a polymer is preferably adjusted to 99 mass % or more, more preferably 99.5 mass % or more.

The concentration of a polymer can be measured by gas chromatography.

Example 8 in [Examples] to be described below is a specific example in which a solvent has been removed by a steam stripping process described in Japanese Patent Publication No. 05-54805. A solvent has been removed by a direct solvent removal method in Examples and Comparative Examples other than Example 8.

The direct solvent removal method refers to a method of removing a solvent without using different solvent such as a large amount of water in steam stripping (steam-using solvent removal method) or the like.

Examples of the direct solvent removal method include, but are not particularly limited to, a method of using a devolatilizing extruder, devolatilizing kneader, and a drum dryer or a flash concentrator. These methods may be used singly or in combination.

A method of using a twin-screw devolatilizing extruder is preferred in terms of good color, high heat discoloration resistance, and high resistance to loss of transparency of a molded article, suppression of filter clogging of an extruder during production, and the ease of recovering a polymer.

More preferred examples include a method of adjusting the concentration of a polymer to 95 mass % or more by introducing a solution containing a polymer into a twin-screw devolatilizing extruder having a twin-screw and a downstream vent zone and generating decompression in a feed zone. Further, the decompression can be adjusted by a control valve arranged on a line for feeding the solution to the screw.

A polymer-containing solution having a temperature of 130 to 200° C. is preferably introduced into the twin-screw devolatilizing extruder.

By setting the temperature of a solution containing a polymer to 200° C. or less, the cleavage of polymer molecular chains can be prevented, and the thermal stability during molding a polymer can be increased. Further, practically sufficient solvent removal rate can be secured by setting the temperature of a polymer-containing solution to 130° C. or more.

It is preferred to inject water between vent zones in conjunction with the forward motion of the screw in the barrel constituting the extruder in terms of good color of a molded article and high removal rate of a solvent.

The twin-screw devolatilizing extruder preferably has a structure having a gear pump between the screw head part and the discharge die part of the twin-screw devolatilizing extruder in terms of smooth discharge and suppression of thermal history to a polymer.

The twin-screw devolatilizing extruder is more preferably an engagement-type twin-screw vent extruder rotating in the same direction which has a plurality of vent zones for exhaust and an L/D of 30 or more (L is the screw length, and D is the outer diameter of the screw) in terms of solvent removal performance and suppression of thermal degradation.

(Step of Removing Part of Solvent from Solution Containing Polymer)

In the method for producing a polymer of the present embodiment, it is preferred to provide a step of removing a part of a solvent in a solution containing a polymer, after the step (3): the step of adding a carbon oxide gas and/or a compound to be decarboxylated to the solution containing the polymer and before charging the solution containing a polymer into an extruder or a devolatilizing kneader and removing a solvent until a concentration of the polymer reaches 95 mass % or more in step (4).

Examples of the method of removing a part of a solvent include a method of directly removing the solvent by heating a solution containing a polymer through a heat exchanger and flash evaporating part of the solvent in a flash concentrator before the solution is charged into an extruder or a devolatilizing kneader in step (4)

This increases the solvent removal performance of an extruder or a devolatilizing kneader in step (4) to provide the effect that thermal degradation can be suppressed, allows achievement of good color, high heat discoloration resistance, and high resistance to loss of transparency of a molded article, and improves the ease of recovering a polymer.

Note that removing part of a solvent means removing 10 mass % to 90 mass %, preferably 30 mass % to 80 mass %, more preferably 40 mass % to 70 mass %, of a solvent in a solution containing a polymer.

(Step (A) of Adding Antioxidant to Solution Containing Polymer)

In the method for producing a polymer of the present embodiment, an antioxidant is preferably added in terms of thermal aging resistance of a polymer and suppression of gelation.

The antioxidant is preferably added after the step (2) of adjusting the amount of water to 10 parts by mass or less based on 100 parts by mass of a solution containing a polymer, and further, the antioxidant is more preferably added after the step (3) of adding a carbon oxide gas and/or a compound to be decarboxylated to a solution containing a polymer in terms of thermal aging resistance of a polymer, suppression of gelation, and good color and high heat discoloration resistance of a molded article.

Further, the antioxidant is preferably added to a solution having a polymer concentration of 90 mass % or less in terms of dispersibility of the antioxidant. Furthermore, when the (step of removing a part of a solvent from a solution containing a polymer) as described above is provided before the solution containing a polymer is charged into an extruder, step (A) of adding an antioxidant to a solution containing a polymer is preferably performed before the (step of removing a part of a solvent from a solution containing a polymer).

Examples of the antioxidant include, but are not limited to, a phenolic antioxidant as a radical scavenger and a phosphorus-based antioxidant and a sulfur-based antioxidant as a peroxide decomposer. Further, an antioxidant having both performance capabilities may be used. These may be used singly or in combination.

It is preferred to add at least a phenolic antioxidant in terms of thermal aging resistance of a polymer and suppression of gelation.

The amount of residual solvent in a polymer obtained by the method for producing a polymer of the present embodiment is 5 mass % or less, but the smaller the amount of the residual solvent is, the more preferable. Therefore, the amount of the residual solvent is preferably 3 mass % or less, more preferably 1 mass % or less, further preferably 0.5 mass % or less, further more preferably 0.3 mass % or less.

EXAMPLES

Hereinafter, the present invention will be specifically described with reference to specific Examples and Comparative Examples, but the present invention is not limited to these examples.

[Evaluation Method]

A method for specifying the structure of polymers obtained in Examples 1 to 8 and Comparative Examples 1 to 4 to be described below and an evaluation method of the polymers will be shown below.

(Vinyl Content, Degree of Hydrogenation, Styrene Content)

The vinyl content, the degree of hydrogenation of unsaturated groups in a conjugated diene, and the styrene content in the polymers produced in Examples and Comparative Examples to be described below were measured by nuclear magnetic resonance spectroscopy analysis (NMR) under the following conditions.

After hydrogenation reaction, a hydrogenated polymer was recovered by precipitating the polymer in a large amount of methanol, followed by acetone extraction and vacuum drying, and performed by 1H-NMR measurement.

Measuring equipment: JNM-LA400 (manufactured by JEOL)

Solvent: Deuterated chloroform

Measuring sample: A sampled article before and after the hydrogenation of polymer Sample concentration: 50 mg/mL Observation frequency: 400 MHz Chemical shift criterion: TMS (tetramethylsilane)

Pulse delay: 2.904 seconds

Number of times of scan: 64 times

Pulse width: 45°

Measurement temperature: 26° C.

(Molecular Weight and Molecular Weight Distribution of Polymer)

The molecular weight and molecular weight distribution (weight average molecular weight Mw/number average molecular weight Mn) of a polymer were measured by gel permeation chromatography (GPC) under the following conditions.

Measurement device: LC-10 (manufactured by Shimadzu Corporation)
Column: TSKgelGMHXL (4.6 mm ID×30 cm), 2 pieces
Solvent: Tetrahydrofuran
Sample for calibration curves: Commercially available standard polystyrene (manufactured by TOSOH CORPORATION), ten-point measurement (Color of Molded Article)

Polymers produced in Examples and Comparative Examples to be described below were each compression molded to produce a sheet having a thickness of 2 mm, and the b value of the resulting sheet was measured using a color difference meter (ZE-2000, manufactured by Nippon Denshoku Industries Co., Ltd.) and evaluated according to the following criteria. Evaluation results were rated as ⊚, ○, Δ, and X in descending order of performance.

b value≤1: ⊚
1<b value≤2: ○
2<b value≤4: Δ
4<b value: X (Heat Discoloration Resistance)

Polymers produced in Examples and Comparative Examples to be described below were each compression molded to produce a sheet having a thickness of 2 mm, and the resulting sheet was heated at 200° C. for 30 minutes in a gear oven. Then, the b value of the resulting sheet was measured using a color difference meter (ZE-2000, manufactured by Nippon Denshoku Industries Co., Ltd.) and evaluated according to the following criteria. Evaluation results were rated as ⊚, ○, Δ, and X in descending order of performance.

b value≤4: ⊚
4<b value≤6: ○
6<b value≤8: Δ
8<b value: X (Resistance to Loss of Transparency)

Polymers produced in Examples and Comparative Examples to be described below were each compression molded to produce a sheet having a thickness of 2 mm. The haze value (degree of cloudiness) of the resulting sheet in a liquid paraffin was measured using a haze meter (NDH-1001DP, manufactured by Nippon Denshoku Industries Co., Ltd.) and evaluated according to the following criteria. Evaluation results were rated as ⊚, ○, Δ, and X in descending order of performance. The haze value was used as an index of transparency.

haze value≤6: ⊚
6<haze value≤10: ○
10<haze value≤15: Δ
15<haze value: X (Filter Clogging Resistance)

A 200-mesh filter was attached to the tip part of a devolatilizing twin screw extruder. The time until the filter is clogged to increase the pressure to 20 kgf/cm$^2$ or more was measured. It was determined that the longer the time, the more economical and satisfactory, and the time was evaluated according to the following criteria. Evaluation results were rated as ○, Δ, and X in descending order of performance.

2 hours or more: ○
1 hour or more and less than 2 hours: Δ
Less than 1 hour: X

Examples 1 to 8

Comparative Examples 1 to 4

Examples 1 to 8 and Comparative Examples 1 to 4 will be described below, in which steps (1) to (4) and step (A) to be described below were suitably selected and the order of performing these steps was changed to produce a polymer.

(Step of Obtaining Polymer)

A predetermined amount of cyclohexane was charged into a vessel-type reactor with a jacket and adjusted to a temperature of 60° C. Then, n-butyllithium was added from the bottom of the reactor so that the amount of n-butyllithium might be 0.08 part by mass based on 100 parts by mass of total monomers (total amount of butadiene monomer and styrene monomer to be charged into the reactor).

Further, a cyclohexane solution of N,N,N',N'-tetramethylethylenediamine was added so that the amount of N,N,N',N'-tetramethylethylenediamine might be 1.8 mol based on 1 mol of the n-butyllithium.

Subsequently, as a monomer, a cyclohexane solution containing styrene of 7 parts by mass (monomer concentration: 20 mass %) was fed as first step in about 10 minutes, and the temperature in the reactor was adjusted to 60° C.

After the completion of feeding, the monomer was allowed to react for 15 minutes while adjusting the temperature in the reactor to 70° C.

Next, a cyclohexane solution containing butadiene of 86 parts by mass (monomer concentration: 20 mass %) was continuously fed as second step to the reactor at a constant speed over 50 minutes, and the temperature in the reactor during the feeding was adjusted to 50° C. After the completion of feeding, the monomer was allowed to react for 10 minutes while adjusting the temperature in the reactor to 50° C.

Next, a cyclohexane solution containing styrene of 7 parts by mass (monomer concentration: 20 mass %) was continuously fed as third step to the reactor at a constant speed over 20 minutes, and the temperature in the reactor during the feeding was adjusted to 70 to 80° C. After the completion of feeding, the monomer was allowed to react for 10 minutes while adjusting the temperature in the reactor to 70° C.

(Step of Deactivating Active Terminal of Polymer)

After completing polymerization as described above, a cyclohexane solution of ethanol was added so that the amount of ethanol might be 1 equivalent based on 1 mol of n-butyllithium to deactivate an active terminal of a polymer, thus obtaining a polymer.

When the polymer was analyzed, the styrene content was found to be 14 mass %; the vinyl content of the butadiene part was found to be 75 mol %; the weight average molecular weight was found to be 148,000; and the molecular weight distribution was found to be 1.05.

(Step of Hydrogenating Polymer)

Next, the obtained polymer (a cyclohexane solution of the polymer in a concentration of 15 mass %) was subjected to hydrogenation using a Ti-based hydrogenation catalyst described in Japanese Patent Laid-Open No. 59-133203 to hydrogenate 99.3 mol % of the unsaturated groups in butadiene.

The solution containing the hydrogenated polymer (a cyclohexane solution of the polymer in a concentration of 15 mass %) was used in all Examples and Comparative Examples of the following Table 1.

(Step (1): Step of Mixing Acid and Water into Solution Containing Polymer)

In Example 1, lactic acid was used as an acid.

In Examples 2 to 8 and Comparative Examples 1, 2, and 4, sulfuric acid was used as an acid.

The amount of water in Examples 1, 2, 5, and 6 and Comparative Examples 1 and 2 was set to 140 parts by mass based on 100 parts by mass of a solution containing a polymer.

The amount of water in Example 3 was set to 30 parts by mass based on 100 parts by mass of a solution containing a polymer.

The amount of water in Examples 4, 7, and 8 was set to 250 parts by mass based on 100 parts by mass of a solution containing a polymer.

The amount of water in Comparative Example 4 was set to 10 parts by mass based on 100 parts by mass of a solution containing a polymer. Note that in step (1) of the present invention, although 20 to 300 parts by mass of water was mixed into 100 parts by mass of a solution containing a polymer, the step in Comparative Example 4 of Table 1 was described as step (1) for convenience.

In Examples 1 to 8 and Comparative Examples 1, 2, and 4, water was mixed with an acid, and then the mixed solution was mixed with a solution containing a polymer.

The step (1) was not performed in Comparative Example 3.

Further, the amount of an acid added was adjusted so that the pH of water to be removed with a decanter in (step (2) of removing water from a mixed solution containing a polymer) to be described below might be 7.0.

The step (1) was continuously performed using a rotating disperser having a mesh structure (trade name: Cavitron CD 1050, motor power: 70 kW, manufactured by Pacific Machinery & Engineering Co., Ltd.).

In Examples 1 to 6, and 8 and Comparative Examples 1, 2, and 4, the molar ratio of titanium (Ti) in a titanium compound to an acid (molar quantity of titanium (Ti) in a titanium compound/molar quantity of an acid) was 0.17.

In Example 7, the molar ratio of titanium (Ti) in a titanium compound to an acid (molar quantity of titanium (Ti) in a titanium compound/molar quantity of an acid) was 0.36.

In Examples 1 to 8 and Comparative Examples 2 and 4, the molar ratio of an added acid to a carbon oxide gas added in step (3) to be described below (molar quantity of the acid/molar quantity of the carbon oxide gas) was 1.3. Note that the carbon oxide gas was not added in Comparative Example 1 as will be described below.

Further, in Examples 1 to 8 and Comparative Examples 1 to 4, the molar ratio of titanium (Ti) to lithium (Li) (Ti/Li) was 0.08 in Examples 1 to 6, and 8 and Comparative Examples 1 to 4 and 0.10 in Example 7. In all Examples and Comparative Examples, the content of a lithium compound in a solution containing a polymer was 0.08 mass % based on the polymer.

(Step (2): Step of Removing Water from Solution Containing Polymer)

In Examples and Comparative Examples except Comparative Example 3, after the step of mixing an acid and water into the solution containing a polymer (step (1)) as described above (however, after step (1) and step (3) in Comparative Example 2), a major portion of water was removed with a decanter (decantation) until the amount of water was 3 parts by mass based on 100 parts by mass of the solution containing a polymer.

In Example 6, the solution was then further centrifuged with a centrifuge (a disc type centrifuge manufactured by Alfa-Laval Inc., relative centrifugal acceleration: 5000 G), and water was removed until the amount of water reached 0.8 parts by mass based on 100 parts by mass of the solution containing a polymer.

(Step (3): Step of Adding Carbon Oxide Gas and/or Compound to be Decarboxylated to Solution Containing Polymer)

In Examples and Comparative Examples except Comparative Example 1, a carbon oxide gas was added to a solution containing a polymer, in an amount of 0.4 mol based on 1 mol of a metal in a polymerization initiator, and these components were mixed in an inline mixer (without a drive part).

(Step (A): Step of Adding Antioxidant)

An antioxidant (octadecyl-3-(3,5-di-t-butyl-4-hydroxyphenyl)propionate) was added to a solution containing a polymer, in an amount of 0.25 parts by mass based on 100 parts by mass of the polymer, and these components were mixed in an inline mixer (without a drive part).

(Step (4): Step of Removing Solvent from Solution Containing Polymer Until Concentration of Polymer Reaches 95 Mass % or More)

In Examples 1 to 7 and Comparative Examples 1 to 4, the solution containing a polymer was first passed through a heat exchanger to be heated to a temperature of 170° C., and part of the solvent was flash evaporated in a flash concentrator.

At the outlet of the concentrator, the temperature dropped to 100° C., and the concentration was 55 mass %.

Next, the solution containing a polymer concentrated as described above was again heated to 160° C. through the heat exchanger and fed to a twin-screw devolatilizing extruder to remove the solvent.

The twin-screw devolatilizing extruder used was an engagement-type twin-screw three-stage vent extruder rotating in the same direction which had a downstream vent zone, an outer diameter of the screw of 65 mm, and an L/D (L: the screw length, and D: the outer diameter of the screw) of 40 and was equipped with a gear pump between a screw head and a die.

As the operating conditions, the screw rotation speed was set to 120 rpm; the polymer extrusion output was 90 kg/hour; and water was added between the second vent zone and the last vent zone (the third vent zone) using a plunger type metering pump in a proportion of 1 part by mass based on 100 parts by mass of the polymer.

The residual cyclohexane concentration in the obtained polymer was found to be 99.7 to 99.8 mass % as measured by gas chromatography.

In Example 8, a steam stripping process was performed as described in Japanese Patent Publication No. 05-54845, followed by kneading in a twin-screw extruder having an outer diameter of the screw of 65 mm and an L/D of 35 to obtain a polymer.

The following Table 1 showed the order of performing steps (1) to (4) and step (A) applied to the method for producing a polymer in Examples 1 to 8 and Comparative Examples 1 to 4 and the evaluation results of the color and heat discoloration resistance of a molded article, and filter clogging resistance of the polymer produced.

In Table 1, blank columns indicate that no step is present.

(4) a step of removing a solvent from the solution containing the polymer until a concentration of the polymer reaches 95 mass % or more.

TABLE 1

| | | | | | | | | | | Evaluation results | | | |
|---|---|---|---|---|---|---|---|---|---|---|---|---|---|
| | | | | | | | | | | Color of article (b value) ⊚: ≤1 ○: ≤2 Δ: ≤4 X: >4 | Heat discoloration resistance (b value) ⊚: ≤4 ○: ≤6 Δ: ≤8 X: >8 | Resistance to loss of transparency (haze value) ⊚: ≤6 ○: ≤10 Δ: ≤15 X: >15 | Filter clogging resistance ○, Δ, X |
| Example 1 | (1) | → | (2) | → | (3) | → | (A) | → | (4) | ○ | Δ | ○ | ○ |
| Example 2 | (1) | → | (2) | → | (3) | → | (A) | → | (4) | ○ | ⊚ | ○ | ○ |
| Example 3 | (1) | → | (2) | → | (3) | → | (A) | → | (4) | ○ | ○ | ○ | Δ |
| Example 4 | (1) | → | (2) | → | (3) | → | (A) | → | (4) | ○ | ○ | ○ | ○ |
| Example 5 | (1) | → | (2) | → | (A) | → | (3) | → | (4) | Δ | Δ | ○ | ○ |
| Example 6 | (1) | → | (2) | → | (3) | → | (A) | → | (4) | ⊚ | ⊚ | ⊚ | ○ |
| Example 7 | (1) | → | (2) | → | (3) | → | (A) | → | (4) | Δ | ○ | ○ | Δ |
| Example 8 | (1) | → | (2) | → | (3) | → | (A) | → | (4) | ○ | Δ | ○ | ○ |
| Comparative Example 1 | (1) | → | (2) | → | (A) | → | (4) | | | Δ | X | ○ | ○ |
| Comparative Example 2 | (1) | → | (3) | → | (2) | → | (A) | → | (4) | Δ | Δ | Δ | ○ |
| Comparative Example 3 | (3) | → | (A) | → | (4) | | | | | X | Δ | X | X |
| Comparative Example 4 | (1) | → | (2) | → | (3) | → | (A) | → | (4) | X | Δ | Δ | Δ |

In Examples 1 to 8, an excellent polymer was obtained which has good color, high heat discoloration resistance, and high resistance to loss of transparency of a molded article, and hardly clogs a filter of an extruder during production of the polymer.

The present application is based on Japanese Patent Application (Japanese Patent Application No. 2013-005658) filed in the Japan Patent Office on Jan. 16, 2013, the contents of which are incorporated herein by reference.

INDUSTRIAL APPLICABILITY

The method for producing a polymer of the present invention has industrial applicability as a method for producing material resins for various applications such as automotive interior and exterior components, electric wires and housings for household appliances, materials for civil engineering and construction, sporting goods, medical and health care articles, adhesives, and protective films, and for producing modifiers of polypropylene and polyethylene for tubes, bags, and the like.

What is claimed is:

1. A method for producing a polymer comprising: a polymerization step of polymerizing at least a conjugated diene monomer in a hydrocarbon solvent using an organolithium compound as a polymerization initiator, and obtaining a polymer; and, following steps (1) to (4), successively performing after the polymerization step:
   (1) a step of mixing an acid and 20 to 300 parts by mass of water into 100 parts by mass of a solution containing the polymer,
   (2) a step of adjusting an amount of the water to 10 parts by mass or less based on 100 parts by mass of the solution containing the polymer,
   (3) a step of adding a carbon oxide gas and/or a compound to be decarboxylated to the solution containing the polymer, and 2. The method for producing the polymer according to claim 1, wherein the solution containing the polymer contains a titanium compound and a lithium compound in steps (1)-(4).

3. The method for producing the polymer according to claim 2, wherein a molar ratio of titanium in the titanium compound to the acid mixed in step (1), molar quantity of titanium in the titanium compound/molar quantity of the acid, is 0.02 to 0.35.

4. The method for producing the polymer according to any one of claims 1 to 3, wherein a molar ratio of the acid mixed in step (1) to the carbon oxide gas and/or the compound to be decarboxylated mixed in step (3), molar quantity of the acid/molar quantity of a sum of the carbon oxide gas and the compound to be decarboxylated, is 0.1 to 2.0.

5. The method for producing the polymer according to any one of claims 1 to 3, wherein the acid mixed in step (1) is an inorganic acid.

6. The method for producing the polymer according to any one of claims 1 to 3, wherein the carbon oxide gas is added in step (3).

7. The method for producing the polymer according to any one of claims 1 to 3, wherein the solvent is directly removed in step (4).

8. The method for producing the polymer according to any one of claims 1 to 3, further comprising step (A) of adding an antioxidant to the solution containing the polymer after step (3).

9. The method for producing the polymer according to any one of claims 1 to 3, further comprising a step of removing a part of the solvent in the solution containing the polymer after step (3) and before step (4).

10. The method for producing the polymer according to any one of claims 1 to 3, wherein step (2) is performed by decantation.

11. The method for producing the polymer according to any one of claims 1 to 3, wherein step (2) is performed using a centrifuge.

12. The method for producing the polymer according to any one of claims 1 to 3, wherein the polymer is a block copolymer formed of the conjugated diene monomer and an aromatic vinyl monomer.

13. The method for producing the polymer according to any one of claims 1 to 3, wherein the polymer has a vinyl content based on a total amount of conjugated diene monomer units before hydrogenation of 50 mol % or more.

* * * * *